(12) United States Patent
Scott et al.

(10) Patent No.: US 10,240,480 B2
(45) Date of Patent: Mar. 26, 2019

(54) VARIABLE TURBINE GEOMETRY VANE WITH SINGLE-AXLE, SELF-CENTERING PIVOT FEATURE

(71) Applicant: BorgWarner Inc., Auburn Hills, MI (US)

(72) Inventors: Shannon Scott, Arden, NC (US); Eli Morgan, Leicester, NC (US)

(73) Assignee: BorgWarner Inc., Auburn Hills, MI (US)

( * ) Notice: Subject to any disclaimer, the term of this patent is extended or adjusted under 35 U.S.C. 154(b) by 424 days.

(21) Appl. No.: 14/940,440

(22) Filed: Nov. 13, 2015

(65) Prior Publication Data

US 2016/0146037 A1 May 26, 2016

Related U.S. Application Data

(60) Provisional application No. 62/082,693, filed on Nov. 21, 2014.

(51) Int. Cl.
*F01D 17/16* (2006.01)
*F02B 37/24* (2006.01)

(52) U.S. Cl.
CPC ............ *F01D 17/165* (2013.01); *F02B 37/24* (2013.01); *F05D 2220/40* (2013.01); *Y02T 10/144* (2013.01)

(58) Field of Classification Search
CPC .... F01D 17/165; F01D 17/167; F01D 17/162; F01D 17/00; F01D 17/12; F01D 17/14;
(Continued)

(56) References Cited

U.S. PATENT DOCUMENTS 1,942,589 A * 1/1934 Biggs ................... F03B 3/183
                                                              251/175
2,565,925 A * 8/1951 Lombard .............. F01D 5/147
                                                              269/152

(Continued)

FOREIGN PATENT DOCUMENTS

CN          101896704 A       11/2010
DE      102008020932 A1 * 10/2009   .......... F01D 17/165
WO       WO2014128895 A1      8/2014

OTHER PUBLICATIONS

Chinese Office Action (with English language translation) dated Feb. 11, 2018, in Chinese Application No. 201510794950.0.

*Primary Examiner* — Jason D Shanske
*Assistant Examiner* — Joshua R Beebe
(74) *Attorney, Agent, or Firm* — Eric L. Doyle; Stephan A. Pendorf; Patent Central LLC

(57) ABSTRACT

A vane pack assembly (25) for a variable geometry turbocharger (10) including a an upper vane ring (28) and a lower vane ring (30) and a plurality of single-axle, self-centering adjustable guide vanes (26) disposed in a turbine housing (20). The plurality of guide vanes (26) include a post (50) having a vane (52) formed integrally therewith. Each post (50) includes a convex self-centering pivot feature (56a, 56b) at one end adapted to seat in a complementary shaped concave self-centering pivot recess (48) of the lower vane ring. The vanes (52) are positioned between the upper and lower vane rings (28, 30) and pivot to control exhaust flow to a turbine wheel. The self-centering pivot features compensate for movement or deformation of the turbine housing (20) and vane rings (28, 30) due to the effects of differential thermal expansion.

9 Claims, 5 Drawing Sheets

(58) Field of Classification Search
CPC ........ F01D 17/16; F02B 37/24; Y02T 10/144; F05D 2220/40
See application file for complete search history.

(56) References Cited

U.S. PATENT DOCUMENTS

| | | | | |
|---|---|---|---|---|
| 4,657,480 A * | 4/1987 | Pfeil | ................... | F04D 29/462 415/147 |
| 5,146,752 A * | 9/1992 | Bruestle | ............... | F01D 17/105 415/164 |
| 5,947,681 A * | 9/1999 | Rochford | ............. | F01D 17/165 415/150 |
| 6,050,775 A * | 4/2000 | Erdmann | ............. | F01D 17/165 384/138 |
| 6,145,313 A * | 11/2000 | Arnold | ................... | F02B 37/00 60/605.2 |
| 6,558,117 B1 * | 5/2003 | Fukaya | ................. | F01D 17/165 415/160 |
| 7,431,560 B2 * | 10/2008 | Sterner | ................. | F01D 17/165 415/160 |
| 7,670,107 B2 * | 3/2010 | Barthelet | ............. | F01D 17/165 29/889.2 |
| 8,485,779 B2 * | 7/2013 | Matsuyama | ........... | F01D 17/165 415/164 |
| 2005/0016182 A1 * | 1/2005 | Morenko | ................ | F23R 3/50 60/800 |
| 2007/0231125 A1 * | 10/2007 | Oeschger | ............. | F04D 29/462 415/160 |
| 2008/0193281 A1 * | 8/2008 | Sausse | ...................... | F01D 9/04 415/158 |
| 2010/0310365 A1 * | 12/2010 | Matsuyama | .......... | F01D 11/005 415/212.1 |
| 2011/0286838 A1 * | 11/2011 | Boening | ............... | F01D 17/165 415/170.1 |
| 2014/0321990 A1 * | 10/2014 | Ikegami | ................ | F01D 17/165 415/148 |
| 2015/0354444 A1 * | 12/2015 | Hayashi | ................. | F02B 37/24 415/148 |

* cited by examiner

VARIABLE TURBINE GEOMETRY VANE WITH SINGLE-AXLE, SELF-CENTERING PIVOT FEATURE

CROSS-REFERENCE TO RELATED APPLICATIONS

This application claims the benefit of U.S. Patent Application No. 62/082,693 filed on Nov. 21, 2014, the disclosure of which is herein incorporated by reference in its entirety.

BACKGROUND OF THE DISCLOSURE

Field of the Disclosure

This invention is directed to a turbocharging system for an internal combustion engine and more particularly to a variable turbine geometry (VTG) vane pack assembly having a single-axle, self-centering pivot feature that provides braking capability and durability to the VTG vane pack assembly while allowing for thermal distortion.

Description of Related Art

A turbocharger is a type of forced induction system used with internal combustion engines. Turbochargers deliver compressed air to an engine intake, allowing more fuel to be combusted, thus boosting the horsepower of the engine without significantly increasing engine weight. Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

Turbochargers typically include a turbine housing connected to the exhaust manifold of the engine, a compressor housing connected to the intake manifold of the engine, and a center bearing housing disposed between and coupling the turbine and compressor housings together. The turbine housing defines a generally annular chamber, consisting of a scroll or volute, surrounds the turbine wheel and receives exhaust gas from an exhaust supply flow channel leading from the exhaust manifold of the engine. The turbine assembly generally includes a throat that leads from the chamber into the turbine wheel. The turbine wheel in the turbine housing is rotatably driven by an inflow of exhaust gas supplied from the exhaust manifold. A shaft, rotatably supported in the center bearing housing, connects the turbine wheel to a compressor impeller in the compressor housing so that rotation of the turbine wheel causes rotation of the compressor impeller. The shaft connecting the turbine wheel and the compressor impeller defines a line which is the axis of rotation. Exhaust gas flows the annular turbine chamber, consisting of a scroll or volute, through the throat, to the turbine wheel, where the turbine wheel is driven to spin at extremely high speeds by the exhaust gas. A turbine flow and pressure control means is used to adjust exhaust gas backpressure and turbocharger speed. As the turbine wheel spins at extremely high speeds, the turbine extracts power from the exhaust gas to drive the compressor. The compressor draws in ambient air through an inlet of the compressor housing and the ambient air is compressed by the compressor wheel and is then discharged from the compressor housing to the engine air intake. Rotation of the compressor impeller increases the air mass flow rate, airflow density and air pressure delivered to the cylinders of the engine via the engine intake manifold thus boosting an output of the engine, providing high engine performance, reducing fuel consumption, and environmental pollutants by reducing carbon dioxide ($CO_2$) emissions.

Turbochargers by design operate optimally a limited range of operating conditions. A large turbine may operate optimally at higher air mass flow rates. However, at low air mass flow rates, a large turbine is not efficient, and is unable to quickly spin up to meet the demand for boost, a phenomenon referred to as turbo lag. On the other hand, a small turbine may provide good boost at lower air mass flow rates. But a small turbine can choke when subjected to higher air mass flow rates. For this reason, small turbines may be equipped with bypass as a simple form of boost pressure control. For a turbine equipped with bypass, the turbine size is chosen such that torque characteristic requirements at low engine speeds can be met and good vehicle driveability achieved. With this design, more exhaust gas than required to produce the necessary boost pressure is supplied to the turbine shortly before the maximum torque is reached. Once a specific boost pressure is achieved, part of the excess exhaust gas flow is fed around the turbine via a bypass. The wastegate which opens or closes the bypass is usually operated by a spring-loaded diaphragm in response to the boost pressure. However, bypassing the turbine means that some of the exhaust energy is wasted and not recovered.

Variable turbine geometry allows the turbine flow cross-section to be varied in accordance with the engine operating point. This allows the entire exhaust gas energy to be utilised and the turbine flow cross-section to be set optimally for each operating point. As a result, the efficiency of the turbocharger and hence that of the engine is higher than that achieved with the bypass control. See Mayer "Turbochargers, Effective Use of Exhaust Gas Energy", Verlag Moderne Inudstrie, $2^{nd}$ Revised Edition 2001. Variable guide vanes between the volute housing and the turbine wheel have an effect on the pressure build-up behavior and, therefore, on the turbine power output. At low engine speeds, the flow cross-section is reduced by closing the guide vanes. The boost pressure and hence the engine torque rise as a result of the higher pressure drop between turbine inlet and outlet. At high engine speeds, the guide vanes gradually open. The required boost pressure is achieved at a low turbine pressure ratio and the engine's fuel consumption reduced. During vehicle acceleration from low speeds the guide vanes close to gain maximum energy of the exhaust gas. With increasing speed, the vanes open and adapt to the corresponding operating point.

Today, the exhaust gas temperature of modern high-output diesel engines amounts to up to 830° C. The precise and reliable guide vane movement in the hot exhaust gas flow puts high demands on materials and requires tolerances within the turbine to be exactly defined. Irrespective of the turbocharger frame size, the guide vanes need a minimum clearance to ensure reliable operation over the whole vehicle lifetime.

Typically, the adjustable guide vanes of a VTG are pivotably mounted within the turbine housing between a pair of vane rings (upper and lower) and/or a nozzle wall. The adjustable guide vanes are pivoted to control the exhaust gas backpressure and the turbocharger speed by modifying the velocity or direction of exhaust gas flow to the turbine wheel. At lower exhaust gas air mass flow rates the adjustable guide vanes may be moved to a relatively closed position, creating a smaller passage for the flow of exhaust gas. Thereby, the VTG simulates a small turbine, able to achieve higher rotational speeds, even with lower exhaust gas availability. On the other hand, when the engine is at higher speed, exhaust gas air mass flow rate is high. Therefore, the adjustable guide vanes may be opened, creating a larger passage for the flow of exhaust gas and an appropriate amount of boost as needed. The ability of the adjustable guide vanes to open and close allows the turbocharger to operate under a wider range of conditions to meet engine demands. By comparison with bypass control, the VTG utilizes the entire exhaust gas energy, so that the efficiency of the exhaust gas turbocharger, and thus the engine, is enhanced.

VTG turbochargers generally employ at least three fasteners such as studs, bolts, or studs with nuts, to secure the pair of vane rings (i.e. an upper vane ring and a lower vane ring) to the turbine housing such that the turbine housing assembly surrounds the pair of vane rings. The fasteners pass through both of the vane rings to clamp the upper vane ring to the lower vane ring and the lower vane ring to the turbine housing. Any exhaust gas bypassing the vane and flowing through the gap between vane and vane rings reduces efficiency of the VTG. Thus, in order for the vanes to optimally control flow of exhaust gas, the gap between vanes and vane rings must be very small. For the vanes to pivot with such small clearance, the VTG vane assembly must be mounted to the turbine housing with a high degree of geometric parallelism. This parallelism must be maintained as the turbine is subject to a very broad temperature range. Different components are made of different metals, which have different thermal coefficients of expansion. The turbine housing undergoes a certain amount of deformation across temperature ranges due to differential thermal expansion. Deformation of the turbine housing causes the securing mechanisms/fasteners to loose geometric parallelism, so that the vanes and moving components can no longer freely pivot and thus stick or lock-up. Loss of parallelism of the securing mechanisms/fasteners also generates high stress in the securing mechanisms/fasteners, which may lead to failure or breakage of the securing mechanisms/fasteners. Distortion of the vane rings may leads to unusual wear patterns or generates unwanted clearances, which further reduce the aerodynamic efficiency of the turbocharger.

Thus, there is a need for a VTG assembly that allows the vane ring assembly to be positioned and function within the turbine housing. There is a further need to account for thermal growth and distortion of the turbine housing and/or vane ring assembly while maintaining the position of the components of the vane assembly with respect to one another, optimizing peak efficiency. There is a yet an additional need for such a system and method that is cost effective, dependable, and that facilitates an ease of manufacture, assembly and/or disassembly.

SUMMARY OF THE INVENTION

These objects are achieved by a variable turbine geometry (VTG) turbocharger including a vane pack assembly having a plurality of single-axle, self-centering adjustable guide vanes. The vane pack assembly may include a generally annular first or upper vane ring and a generally annular second or lower vane ring. The plurality of spacers are disposed between the upper vane ring and the lower vane ring such that the upper vane ring is spaced from the lower vane ring creating an annular space. Within this annular space, multiple single-axle, self-centering adjustable guide vanes are pivotably mounted. The guide vanes are pivotably mounted between the upper vane ring and the lower vane ring. The guide vanes may include a post having a self-centering pivot feature. Preferably, one or both ends of the post are hemi-spherical and are received in a "U" shaped recess in the vane ring. The post fits into the recess in the manner of a ball-in-socket. Compared to a conventional cylindrical post in a cylindrical bore, which will bind in the event of misalignment between upper and lower rings or between successive posts or rotation of one vane ring relative to the other vane ring, in the case of ball-in-socket fitting posts, any misalignment of the posts is easily tolerated and will not result in binding. The self-centering pivot feature of the post allows the vane pack assembly to function in spite of displacement/deformation of the turbine housing as a result of exposure to a wide range of temperatures. An actuation mechanism is used to control the pivotal movement of the guide vanes thereby controlling the exhaust gas velocity and backpressure by opening and closing the guide vanes.

The plurality of single-axle, self-centering adjustable guide vanes allow the vane ring assembly to be disposed within the turbine housing negating the effect of thermal expansion, or the effects of differential thermal growth, of the housing and/or vane ring assembly while maintaining turbocharger efficiency. In addition, the self-centering pivot feature of the plurality of guide vanes adds durability and braking capability to the vane pack assembly by limiting the bending moment that aerodynamic forces tend to impart thereon. The plurality of guide vanes are cost effective, dependable, and are designed for an ease of assembly. The self-centering pivot surface would allow the vanes to continue to pivot within the single-axle joint if deformation of the lower vane ring or housing occurs. A wider range of materials could then be considered for the lower vane ring or turbine housing. Over the lifetime of the system, the self-centering surface would continue to guide the vane post to pivot in the designed manner.

BRIEF DESCRIPTION OF THE FIGURES

Further details, advantages and features of the present invention will emerge from the following description of exemplary embodiments and on the basis of the drawings in which.

DETAILED DESCRIPTION OF THE INVENTION

Figure 1:
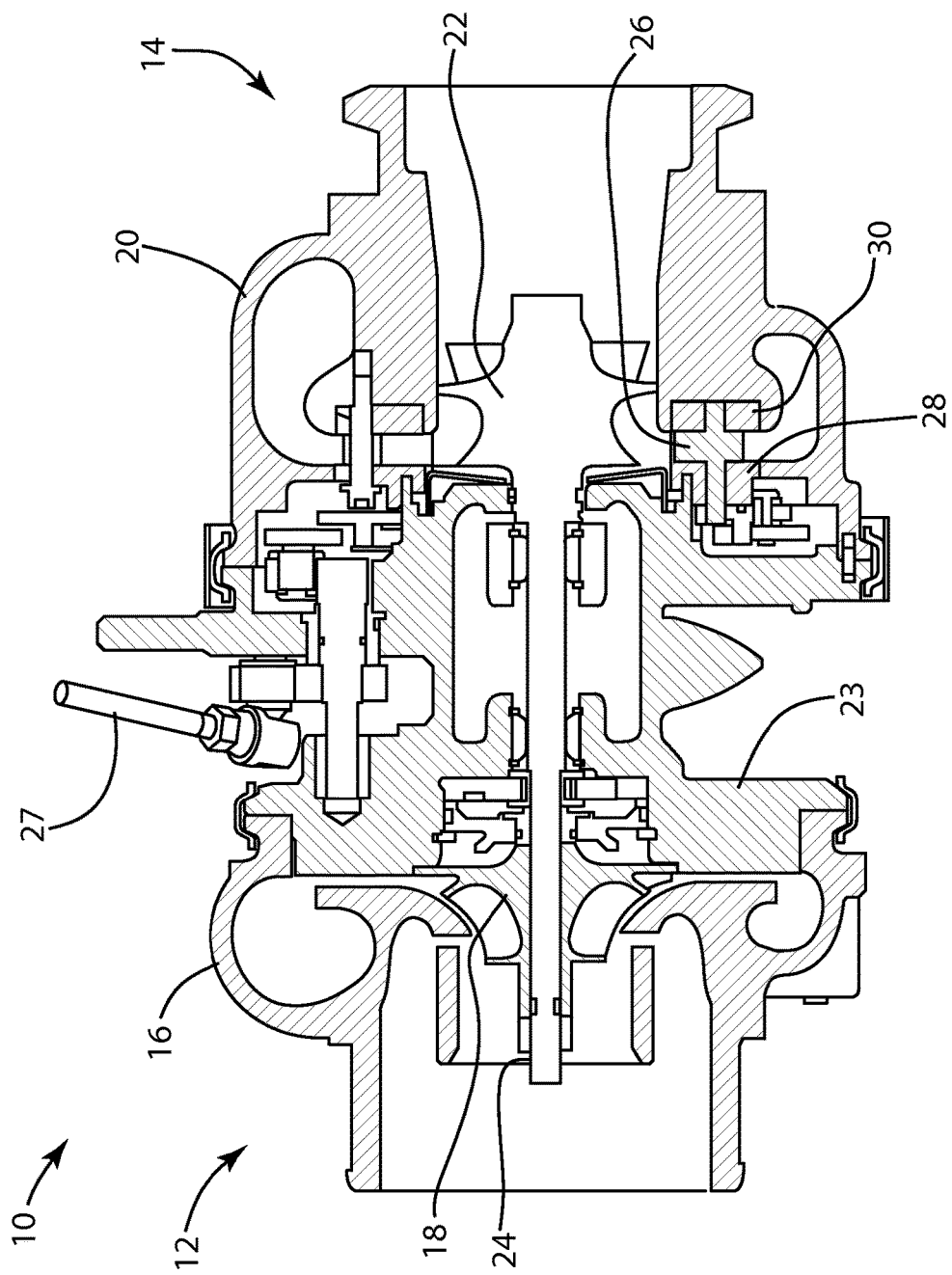
FIG. 1 is a cross-sectional view of an aspect of a variable turbine geometry (VTG) turbocharger.

FIG. 1 details an aspect of a turbocharger (10) including a compressor stage (12) and a turbine stage (14). The compressor stage (12) includes a compressor housing (16) and a compressor wheel (18). The turbine stage (14) includes a turbine housing (20) and a turbine wheel (22). The compressor housing (16) is spaced from the turbine housing (20) by a bearing housing (23). A shaft (24) extends through the bearing housing (23) connecting the compressor wheel (18) to the turbine wheel (22). A vane pack assembly (25) (shown in greater detail in FIG. 2) includes a plurality of single-axle, self-centering adjustable guide vanes (26) located between a generally annular first or upper vane ring (28) and a generally annular second or lower vane ring (30). Each of the plurality of guide vanes (26) are caused to pivot by an actuating mechanism (27). The actuating mechanism (27) may include a pneumatic actuator, geared actuator, electric actuator or any similar mechanism known in the art.

Figure 2:
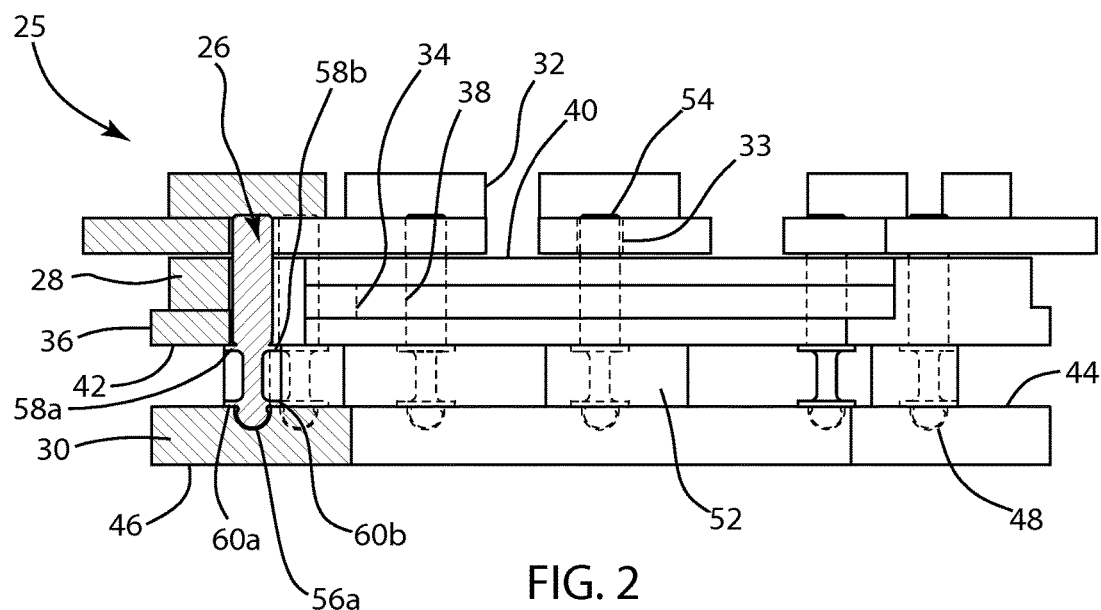
FIG. 2 is sectional view of an aspect of the vane pack assembly.

The vane pack assembly (25) is detailed in FIG. 2. In some aspects, the basic components of the vane pack assembly (25) include the plurality of guide vanes (26) (FIG. 3), the upper vane ring (28), the lower vane ring (30), spacers (70) disposed between the upper vane ring (28) and the lower vane ring (30), and a plurality of vane adjustment levers (74). The cross hatching is omitted from the right part of the figure so that the ghost lines indicating posts (50) may be seen. The upper vane ring (28) includes a plurality of approximately equally spaced apertures (38) which extend through the upper vane ring (28) from an upper surface (40) to a bottom surface (42) thereof. The lower vane ring (30) includes an upper surface (44) and a bottom surface (46). The top surface (44) of the lower vane ring (30) includes a plurality of approximately equally spaced self-centering pivot recesses (48). The pivot recesses (48) extend from the top surface (44) of the lower vane ring (30), partially into the lower vane ring (30). The pivot recesses (48) do not extend entirely through to the bottom surface (46) of the lower vane ring (30).

Figure 3:
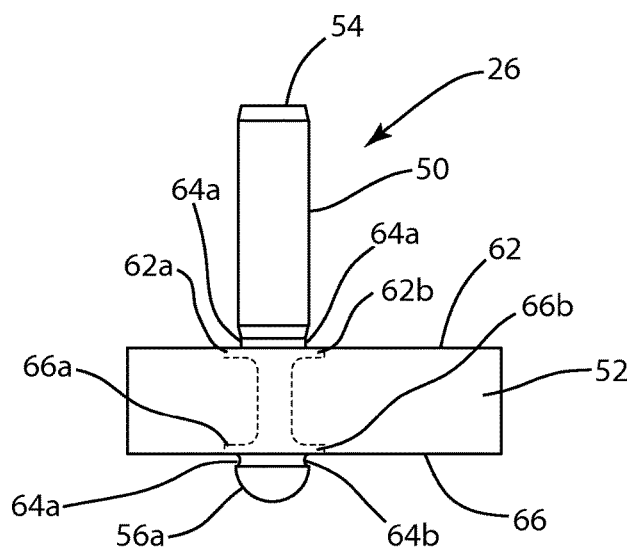
FIG. 3 is a front view of an aspect of the single-axle, self-centering adjustable guide vane in FIG. 2.

In one aspect, each of the plurality of guide vanes (26), shown in FIG. 3, includes a post (50) having a vane (52) formed integrally therewith. The post (50) includes a first end (54) and a second end having a self-centering pivot feature (56a). The first end (54) of the post (50) may extend entirely through and slightly beyond the top surface (40) of the upper vane ring (28). The plurality of vane adjustment levers (74) includes a plurality of though holes (33) through which the first end (54) of the post (50) of the guide vane (26) extends. The post (50), extending through the plurality of vane adjustment levers (74) slidably flush mounts the plurality of vane adjustment levers (74) pivotably to the upper vane ring (28). The self-centering pivot feature (56a) of the second end of the post (50) is received within a corresponding self-centering pivot recesses (48) to position and center the guide vane (26) with respect to the lower vane ring (30). The exhaust gas flows at high pressure and velocity through the annular gap between the lower surface of the upper vane ring and the upper surface of the lower vane ring. In order to prevent escape of exhaust gas through the aperture (38), the guide vane (26) further includes a flange (58) in the annular space covering over the aperture (38) at the lower surface of the upper vane ring. The guide vane may be provided with a second flange (60) covering over the self-centering pivot recesses (48) at the upper surface of the lower vane ring. The flanges (58, 60) also ensure precise spacing between the vane (52) and the lower surface of the upper vane ring and the upper surface of the lower vane ring.

The self-centering pivot feature (56a) can be hemi-spherically-shaped. While the self-centering pivot feature (56a) of FIGS. 2 and 3 are hemi-spherically-shaped, other shapes have been known to work well.

Figure 4:
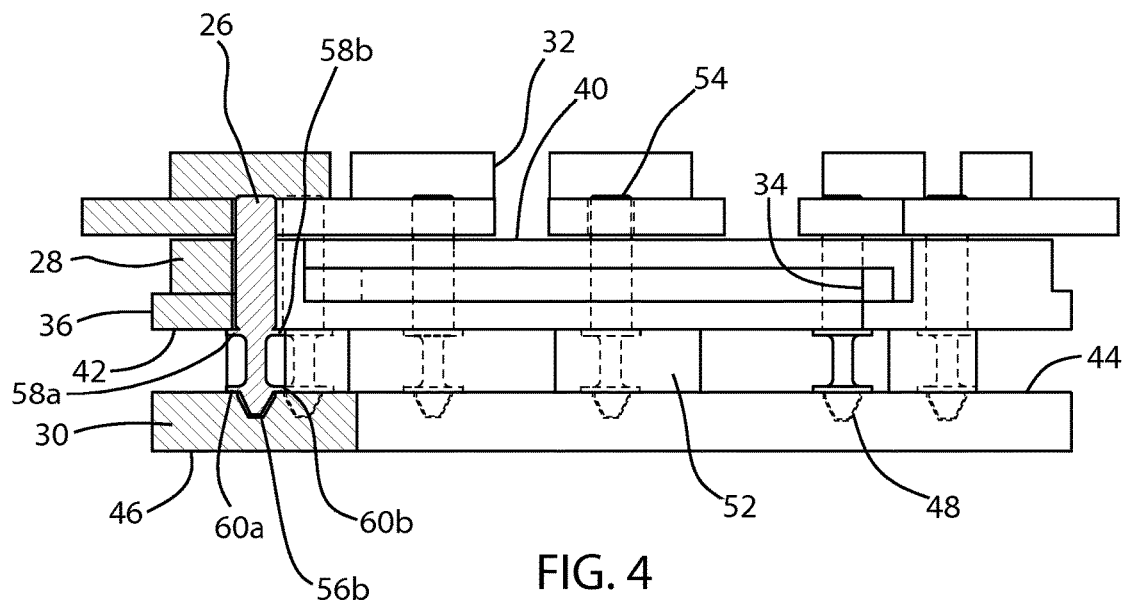
FIG. 4 is sectional view of another aspect of the vane pack assembly.
Figure 5:
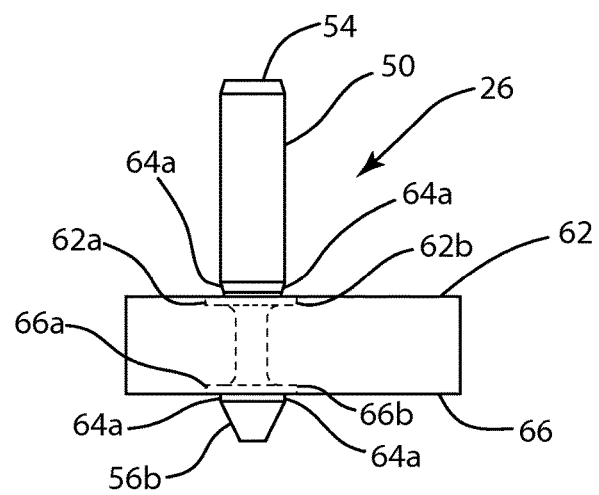
FIG. 5 is a front view of an aspect of the single-axle, self-centering adjustable guide vane in FIG. 4.

In some aspects, as shown in FIGS. 4 and 5, self-centering pivot feature (56b) can be conically-shaped. All other aspects of the invention are similar to those as previously detailed in FIGS. 1-3. While hemi-spherical and conical shapes for the self-centering pivot features (56a, 56b) are detailed, the self-centering pivot features (56a, 56b) may be frusto-conical, frusto-spherical, part-conical, part-spherical, or any combination thereof.

In another aspect, the lower vane ring (30) can be omitted (not shown). In this aspect, the plurality of equally spaced self-centering pivot recesses (48) are formed in the turbine housing (20). The self-centering pivot features (56a, 56b) are received in the plurality of equally spaced self-centering pivot recesses (48) formed in the turbine housing (20). The plurality of guide vanes (26), along with other components of the vane pack assembly (25) such as spacer (70), assists with maintaining the vane pack assembly (25) with respect to the turbine housing (20). As such, the vane pack assembly (25) is allowed to pivot in order to compensate for movement or deformation of the turbine housing (20) due to the effects of thermal growth, or the effects of differential thermal growth. This type of movement would otherwise not be possible with conventional dual axle and/or other commonly known turbocharger arrangements.

Most preferably, one or both ends of the post are hemispherical and are received in a "U" shaped recess in the vane ring. The post fits into the recess in the manner of a ball-in-socket. Compared to a conventional cylindrical post in a cylindrical bore, which will bind in the event of misalignment between vane rings or between successive posts or rotation of one vane ring relative to the other vane ring, in the case of ball-in-socket fitting posts, any misalignment of the posts is easily tolerated and will not result in binding.

The turbocharger (10) operates at high frequency rotation range of 150,000 to 300,000 RPM and can be subjected to temperatures in excess of 1050° C. These conditions generate thermal profiles and differential thermal expansions, which are not conducive to close tolerance components, which require minimal distortion in order to prevent sticking or excessive wear of the components. As such, the particular size, shape, number, and material of the plurality of single-axle, self-centering adjustable guide vanes (26) can be selected based upon these characteristics, but are also selected chosen based upon a number of other factors including ease of assembly, size and excitation of the turbine wheel, desired stiffness and thermal deformation control, thermal coefficient of expansion, corrosion resistance, cost, strength and durability. Because the vane pack assembly (25) and components thereof endure high temperatures and extreme exposure to corrosive by-products of engine combustion, materials such as nickel, stainless steel or other similar materials have been known to work well.

Figure 6:
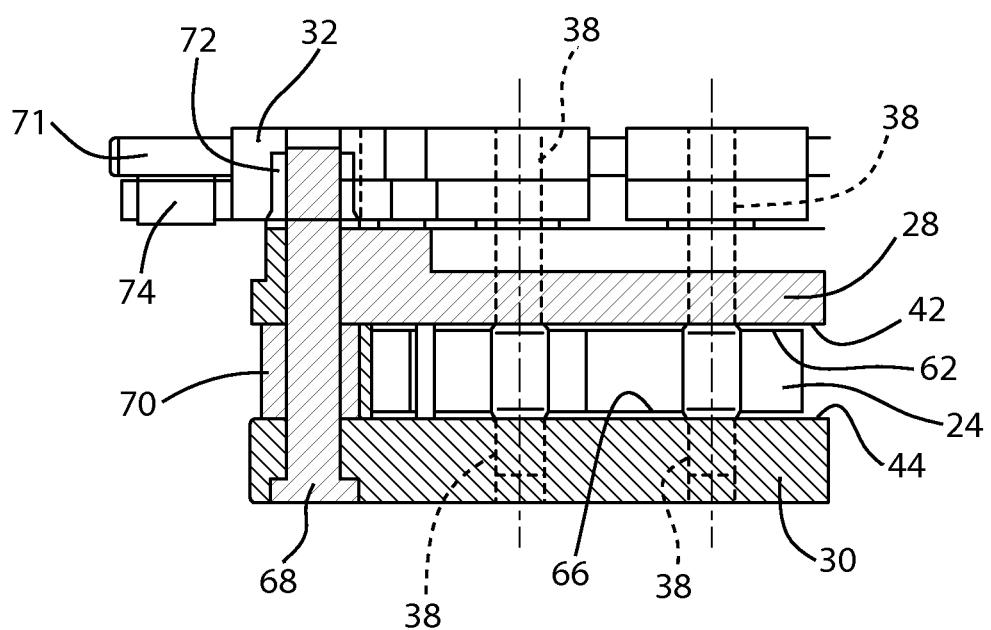
FIG. 6 is a sectional view of an aspect of the VTG turbocharger vane pack assembly showing fastener and spacer.
Figure 7:
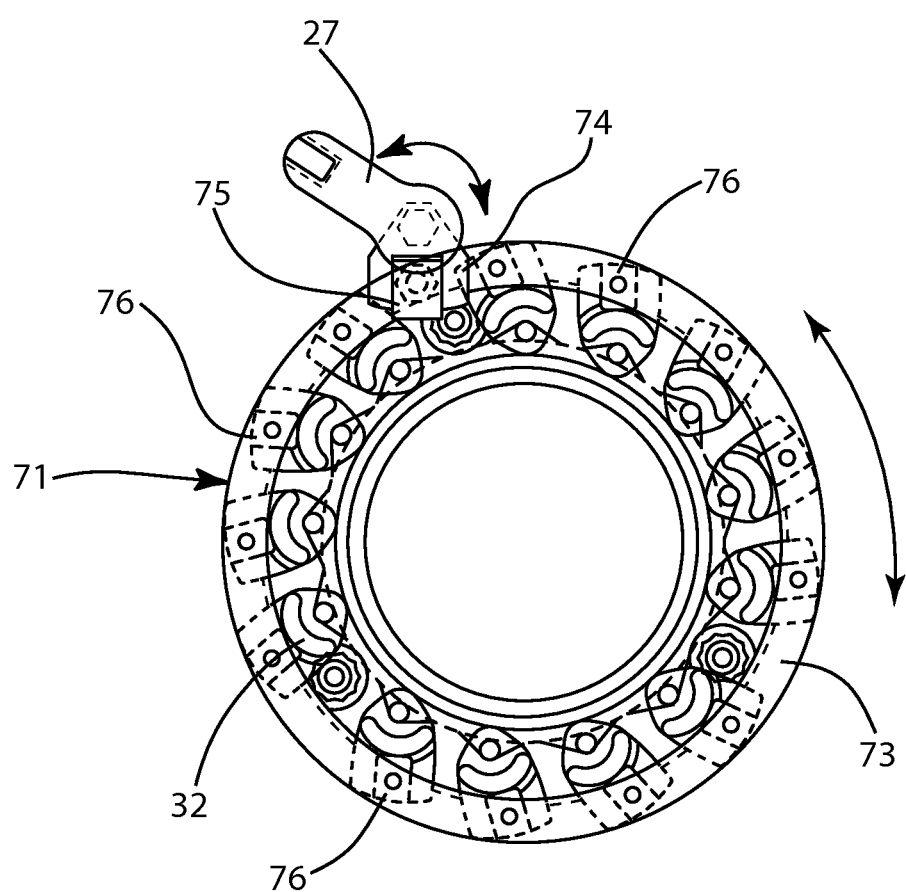
FIG. 7 is a top view of the VTG turbocharger vane pack assembly in FIG. 6.

FIG. 6 details an aspect of the specific arrangement of the vane pack assembly 25). The upper vane ring (28) and the lower vane ring (30) are held together by fastening means (68). A plurality of spacers (70), of which three are shown in FIG. 7, are disposed between the upper vane ring (28) and the lower vane ring (30) either about the fastening means (68), as shown here, or in other locations between the upper vane ring (28) and the lower vane ring (30). Spacers (70) determine the distance between the generally annular upper vane ring (28) and the generally annular lower vane ring (30), maintaining the spacing therebetween. Thus, spacers (70) establish the clearance (not shown) between the flanges (58, 60) and the bottom surface (42) of the upper vane ring (28) and the top surface (44) of the lower vane ring (30). Nuts (72), attached to the fastening means (68), serve to apply a clamp load fastening the upper vane ring (28) and the lower vane ring (30) to the plurality of spacers (70). The fastening means (68) extend through the upper vane ring

(28) and the lower vane ring (30) to form a vane pack assembly (25), which can be easily assembled into the turbine housing (20). Generally, indexing means are provided to orient the vane pack assembly and secure it against rotation.

In use, exhaust gas flows from the engine through the turbocharger (10) to drive the turbine wheel (22) which then drives the compressor wheel (18). The compressor wheel (18) draws air into the turbocharger (10), compresses this air, and delivers it to the intake side of the engine (not shown). During this process, the plurality of guide vanes (26) may be used to control the flow of exhaust gas, which impinges on the turbine wheel (22) and controls the power of the turbine stage (14). The plurality of guide vanes (26) also therefore control the pressure ratio generated by the compressor stage (12).

Further aspects of the operation of the VTG turbocharger (10) are detailed in FIG. 7. A unison ring (71) controls the plurality of guide vanes (26). Unison ring (71) rides on an arcuate surface (32) located on an upper surface of the vane adjustment levers (74). Rotational movement of the unison ring (71) is controlled by the control arm (27) connected to the actuating mechanism which control arm (27) is operatively connected to the unison ring (71) by a lever arm (74) and slide block (75).

The lever arm (27) of the actuating mechanism causes movement of the control arm (74) which is transmitted to the unison ring (71) via slide block (75). As the unison ring (71) rotates, multiple smaller slide blocks (76) rotatingly mounted to the unison ring move along with the unison ring. Movement of the multiple smaller slide blocks (76) which contact between the legs of a fork of the vane adjustment levers (74) results in rotation of the plurality of vane adjustment levers (74). This movement causes the rotational movement of the plurality of guide vanes (26) which changes the angular position of the vanes (52) to vary and thereby control the exhaust gas flow.

As the turbocharger (10) operates and is exposed to the extreme temperature fluctuations in the turbine stage (14), the turbine housing (20) may deform, causing misalignment of the vane pack assembly (25). Upon indication of any slight movement, the self-centering pivot features (56a, 56b) are allowed to pivot within the equally spaced self-centering pivot recesses (48) formed in either the lower vane ring (30) or the turbine housing (20). The pivoting motion thereby accurately permits a controlled positioning of the vane pack assembly (25) within the turbine housing (20) as the turbine housing (20) undergoes movement/deformation in response to thermal expansion.

As such, distortion of the upper vane ring (28) and the lower vane ring (30) which causes the vanes (52) and other moving components to stick or lock-up is prevented. Additionally, unusual wear patterns that may develop due to vane (52) distortion are eliminated thereby decreasing the development of unwanted clearances and increasing the aerodynamic efficiency of the turbocharger (10).

It will be appreciated that aspects of a vane pack assembly (25) described herein can provide numerous benefits. For instance, the configuration can permit ease of final assembly. Further, the vane pack assembly (25) can use relatively inexpensive parts and avoids the use of parts made from exotic materials. The vane pack assembly (25) is configured to avoid the need for welding of the parts of the assembly.

An exemplary vane pack assembly (25) including a single-axle, self-centering pivot feature (56a, 56b) has been described. The terminology used herein is intended to be in the nature of the description rather than limitation. It may be apparent that numerous modifications may be possible in light of the above teachings. Therefore, it should be understood that within the scope of the appended claims, the inventive concepts and devices may be practiced other than as explicitly specified within the description.

The invention claimed is:

1. A vane pack assembly (25) for a variable geometry turbocharger comprising:
   an upper vane ring (28);
   a lower vane ring (30) having an upper surface and a lower surface, and having self-centering pivot recesses (48) formed in the upper surface;
   a plurality of single-axle, self-centering adjustable guide vanes (26) including a post (50) having a first end, a second end, and a vane (52) formed integrally therewith, the vane operatively positioned between the upper and lower vane rings (28, 30);
   a plurality of fastening means (68) extending through the upper (28) and lower vane (30) rings; and
   a plurality of spacers (70) for maintaining a spacing between the upper and lower vane rings (28, 30),
   wherein the first end of the post (50) extends through a through-hole (33) in the upper vane ring (28) and is connected to a vane adjustment lever (74) and the second end of the post (50) is provided with a convex self-centering pivot feature (56a, 56b) and is seated in a complementary shaped concave self-centering pivot recess (48) of the lower vane ring.

2. The vane pack assembly (25) of claim 1, wherein the self-centering pivot feature (56a, 56b) is hemi-spherically shaped.

3. The vane pack assembly (25) of claim 1, wherein the self-centering pivot feature (56a, 56b) is conically shaped.

4. The vane pack assembly (25) of claim 1, wherein the self-centering pivot feature (56a, 56b) is frusto-spherically shaped.

5. The vane pack assembly (25) of claim 1, wherein the self-centering pivot feature (56a, 56b) is frusto-conical shaped.

6. The vane pack assembly (25) of claim 1, wherein at least one end of each vane post is hemi-spherical.

7. The vane pack assembly (25) of claim 1, wherein both ends of each vane post are hemi-spherical and are received in corresponding recesses in the upper vane ring (28) and lower vane ring (30).

8. A vane pack assembly (25) for a variable geometry turbocharger comprising:
   an upper vane ring (28);
   a turbine housing (20) having self-centering pivot recesses (48) formed in the surface;
   a plurality of single-axle, self-centering adjustable guide vanes (26) including a post (50) having a first end, a second end, and a vane (52) formed integrally therewith, the vane operatively positioned between the upper vane ring (28) and turbine housing (20);
   a plurality of fastening means (68) extending through the upper vane ring (28) and into the turbine housing (20); and
   a plurality of spacers (70) for maintaining a spacing between the upper vane ring (28) and turbine housing (20),
   wherein the first end of the post (50) extends through a through-hole (33) in the upper vane ring (28) and is connected to a vane adjustment lever (74) and the second end of the post (50) is provided with a convex self-centering pivot feature (56a, 56b) and is seated in self-centering pivot recess (48) of the turbine housing (20) which are concave and complementary in shape to the post (50) convex self-centering pivot feature (56a, 56b).

9. A vane pack assembly (25) for a variable geometry turbocharger comprising:
   an upper vane ring (28);
   a lower vane ring (30) having an upper surface and a lower surface, and having self-centering pivot recesses (48) formed in the upper surface;
   a plurality of single-axle, self-centering adjustable guide vanes (26) including a post (50) having a first end, a second end, and a vane (52) formed integrally therewith, the vane operatively positioned between the upper and lower vane rings (28, 30);
   a plurality of fastening means (68) extending through the upper (28) and lower vane (30) rings; and
   a plurality of spacers (70) for maintaining a spacing between the upper and lower vane rings (28, 30),
   wherein the first end of the post (50) extends through a through-hole (33) in the upper vane ring (28) and is connected to a vane adjustment lever (74) and the second end of the post (50) is provided with a convex self-centering pivot feature (56a, 56b) and is seated in a complementary shaped concave self-centering pivot recess (48) of the lower vane ring with a gap between the convex self-centering pivot feature (56a, 56b) and the complementary shaped concave self-centering pivot recess (48).

* * * * *